United States Patent [19]

Dupin

[11] Patent Number: 4,570,879
[45] Date of Patent: Feb. 18, 1986

[54] PYROTECHNICAL PROCESS AND DEVICE FOR BAILING OUT OF AN AIRCRAFT

[75] Inventor: Gérard Dupin, Clamart, France

[73] Assignee: Avions Marcel Dassault-Breguet, Vaucresson, France

[21] Appl. No.: 587,069

[22] Filed: Mar. 7, 1984

[30] Foreign Application Priority Data

Mar. 14, 1983 [FR] France ................. 83 04126

[51] Int. Cl.⁴ .................. B64C 1/32; B64D 25/10
[52] U.S. Cl. .................. 244/122 AF; 29/1.14; 244/121
[58] Field of Search ......... 244/121, 122 AE, 122 AF, 244/141; 89/1.14; 102/311

[56] References Cited

U.S. PATENT DOCUMENTS 3,281,097 10/1966 De Tienne .................. 244/122 AE
3,561,703 2/1971 Stencel .
3,670,998 6/1972 Charleville et al. .
3,729,154 4/1973 Deplante .
3,806,069 4/1974 Galton .................. 244/122 AF
4,275,858 6/1981 Bolton et al. .................. 89/1 B

FOREIGN PATENT DOCUMENTS 711987 7/1954 United Kingdom .

Primary Examiner—Galen L. Barefoot
Attorney, Agent, or Firm—Watson, Cole, Grindle & Watson

[57] ABSTRACT

When the pilot seated at the front of a high-performance two-seater aircraft equipped with a forwardly-plunging transparent canopy transparency, wants to bail out on his ejection seat, he triggers a two-period pyrotechnical sequence; first, he cuts out a well-bounded fragment or dome located towards the rear of the canopy and right above his head on the seat ejection axis; and only then, upon a second period, he renders frangible the forwardly-plunging front portion of the canopy located above his knees which, at this instant, reach its level and smash it to pieces.

6 Claims, 4 Drawing Figures

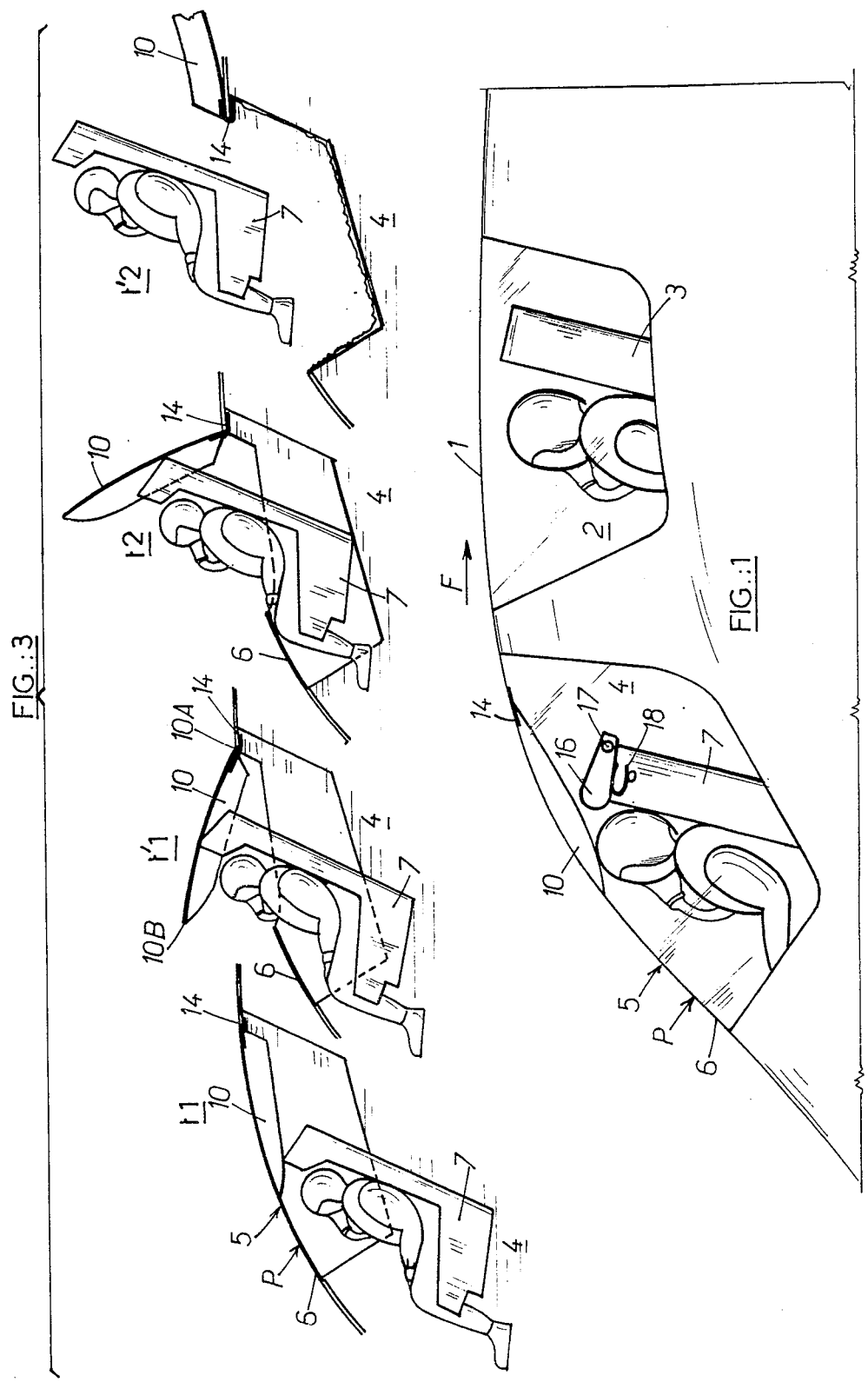

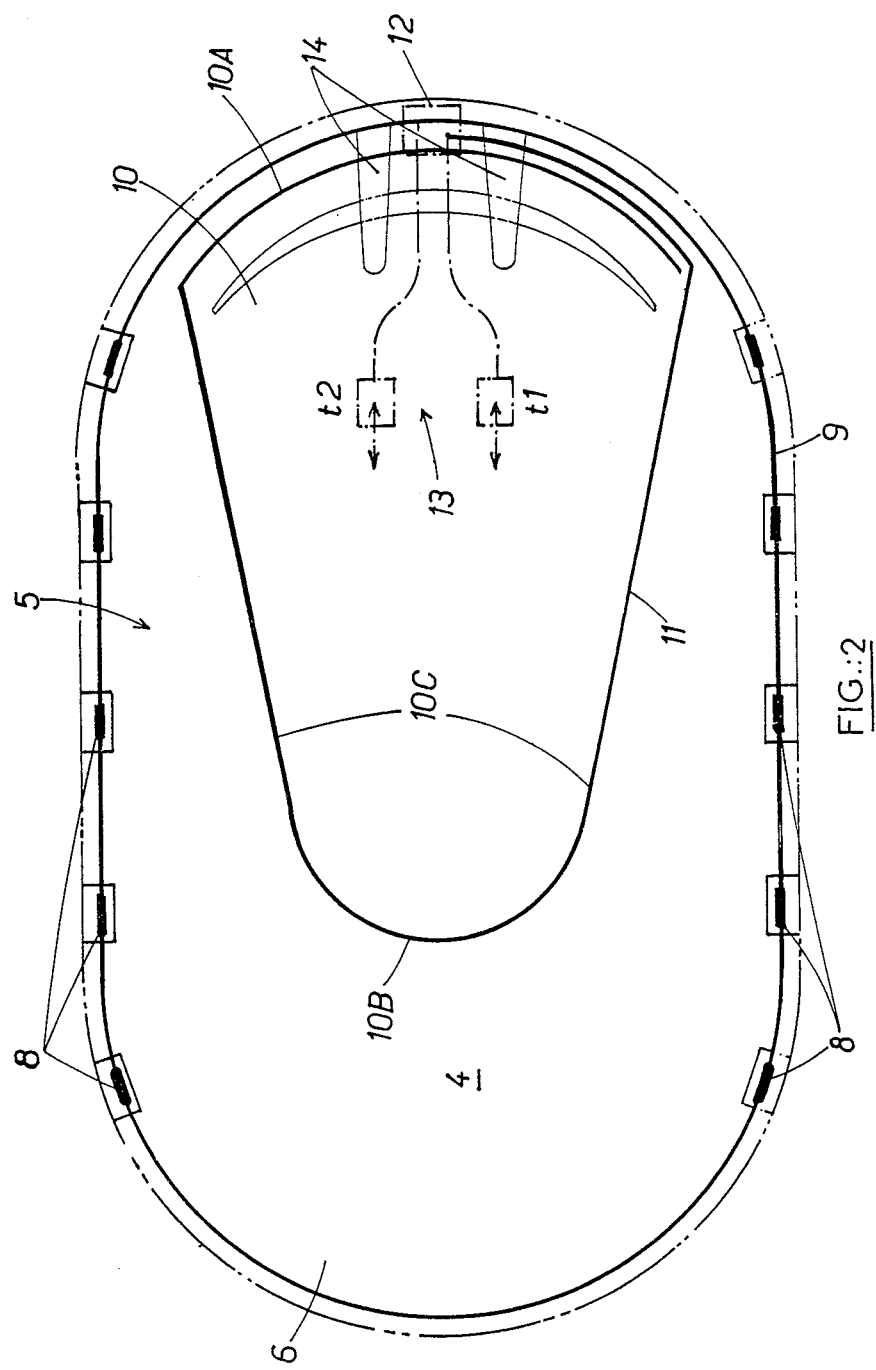
FIG.:2

PYROTECHNICAL PROCESS AND DEVICE FOR BAILING OUT OF AN AIRCRAFT

BACKGROUND OF THE INVENTION

It is known that the bail-out of the crew of high-performance military aircraft being in a situation of distress is carried out by ejection of the seat or seats (depending on whether the aircraft is a single- or a multi-seater) out of the cockpit which is, at any rate during flight, closed by a transparent lid, for instance of "Plexiglas" shaped along the convenient aerodynamic outline, currently called a canopy. Quite clearly, this cockpit-enclosing canopy constitutes a major obstacle in the way of the ejection seat and, if no precautions were taken in order to eliminate it, the occupant of the seat would violently bang against it and could get injured or killed while smashing it to pieces. On the other hand, one cannot rely upon an opening of the canopy prior to ejection of the seat, not only because this action is uncertain due to possible failure or disablement preventing its operation, but also because such a preliminary step would consume a significant amount of time, entailing a substantial delay in the bail-out procedure, which in certain cases could happen to be prohibitive.

So, it has long been known to disengage the canopy from the fuselage of the aircraft immediately (about one second) before ejection of the seat by pyrotechnical means such as explosive bolts or like releasable ties, in order to jettison the canopy assembly (see British Pat. No. 711,987). But this way of proceeding had to be ruled out because in practice it amounted to replacing one hazard with another one just as dangerous: the ejected seat with its passenger on the one hand and the bulky canopy assembly (sometimes weighing several tens of kilograms) presenting sharp corners and ruggedness on the other hand, were evolving through the air with high-speed ragged movements and close to each other, whence the danger of violent collisions. This was particularly true when the aircraft was spinning or on the ground: in such situations, the aerodynamic effects did not remove the jettisoned canopy out of the pilot's path.

In modern military aircraft still equipped with ejection-seats, the canopy jettisoning solution is therefore ruled out, the canopy being now held in position. But the obstacle it then constitutes in the pilot's way is diminished, immediately prior to bail-out, by means of detonating fuses controlling explosive charges properly distributed and designed for causing disintegration or frangibilization of the canopy so that, when passing through it, only minute scattered remains are encountered, which in principle should not bring about severe injuries, i.e., since they are not normally capable of making their way through the usual protective clothes worn by the members of the crew. A description of such canopy disintegration or frangibilization systems are to be found respectively in U.S. Pat. No. 3,561,703 to Stencel and U.S. Pat. No. 3,729,154 to Deplante, which provide details about the use of pyrotechnical means which are today very currently employed.

The canopy frangibilizing system by pyrotechnics of this latter patent has been widely practised by the Applicant's assignee and has given full satisfaction with regard to the safety of the crews, especially of single-seaters or of the rear compartment of two-seaters the canopy of which extends along the relative wind flow. However the Applicant has discovered that safety could be further improved in the case of aircraft having a plunging canopy in its front portion, notably at the front piloting compartment of two-seaters.

Owing to its very shape, which plunges at the front, this portion of the canopy happens indeed to be subjected, at high-speed flight, to considerable dynamic pressure directed towards the inside of the cockpit and to which it can perfectly resist under normal conditions. In contrast, such is no longer the case when pyrotechnical frangibilization of the canopy occurs, in anticipation of seat ejection: as soon as it becomes frangible at $t_o$ time, this front portion, far from remaining cohesive until passage of the ejection seat through the canopy at $t_o + \Delta t$ time, prematurely disintegrates under the action of such dynamic pressure and at once collapses into the interior of the cockpit, projecting its remains in every direction and therefore in part towards the pilot who is still there at this $t_o$ time and during the whole $\Delta t$ time interval until he is out.

SUMMARY OF THE INVENTION

An object of the present invention is to eliminate this drawback or at least to curtail considerably its effects, thanks to an improvement brought to the development of the pyrotechnical treatment proceeding of the canopy.

In accordance with the present invention, this pyrotechnical proceeding develops along a sequence of two consecutive periods: upon a first period—in a manner suggested in U.S. Pat. No. 3,670,998 to Charleville et al.—a sort of dome or well-bounded fractional panel located towards the rear of the canopy right above the pilot's head and bust on the seat ejection axis is cut out, and only then, upon a second period, frangibilization is caused to the plunging front portion of the canopy extending above the legs of the pilot whose knees reach then—at the very beginning of the ejection course—the level of this frangibilized plunging front portion.

Thus frangibilization of the latter is delayed by a time which, though extremely short, is nevertheless sufficient to prevent its remains from overtaking the upper part of the pilot's body and to restrict them at worst to his knees or feet which, being anyway at this instant practically in engagement with this frangibilized portion, do not afford enough time for these remains to gather significant kinetic energy.

According to a technical feature of the present invention, the dome or rear panel of the canopy which is segregated by being cut out at a first period, is provided at its trailing edge with a flexible attachment forming a pseudo-hinge connecting it to the stationary adjacent edge of the opening thus formed, so that immediately following cut-out, the segregated panel rises slightly due either to the action of the vacuum possibly existing at this location or to the thrust of the ejection-seat top, and turns back towards the rear under the action of the relative wind by pivoting about the flexible attachment which can be very simply constituted by a textile strip or adhesive tape. The dome is thus outside the pilot's path.

According to another technical feature of the present invention, the back of the ejection-seat is equipped at its top with a shock absorber which can be a mere resilient buffer through which the ejection-seat, despite its speed gathered at the beginning of the ejection course, nevertheless engages "smoothly" the cut-out canopy pannel, thus avoiding a sharp high-energy shock likely to shatter the panel. The latter will then rise and swing backwards while retaining its integrity.

BRIEF DESCRIPTION OF THE DRAWINGS

In the accompanying drawings:

FIG. 1 is a diagrammatic fragmentary elevation-view showing the cockpit of a two-seater aircraft designed in accordance with the present invention.

FIG. 2 is a diagrammatic plan-view from above of a canopy arranged in accordance with the invention for the front compartment of this two-seater.

FIG. 3 cinematographically illustrates the development of the bail-out procedure of the invention.

DESCRIPTION OF THE PREFERRED EMBODIMENT

Figure 4:
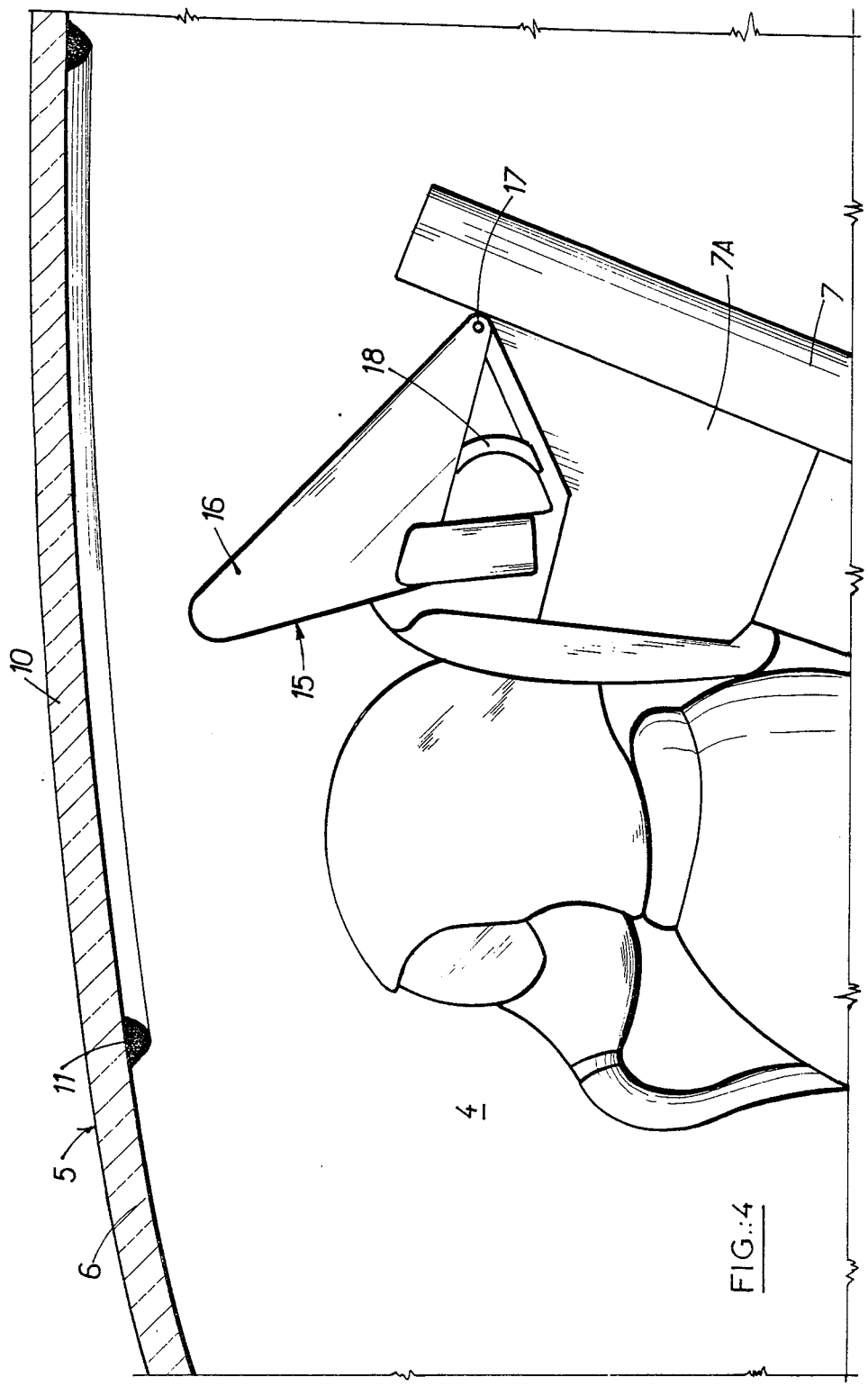
FIG. 4 shows, at a larger scale, a constructional detail of the present invention.

As shown on FIG. 1, the canopy 1 of the rear compartment 2 of the two-seater aircraft is more or less parallel to the air streamlines F of the relative wind; in other words, this canopy 1 extends generally along the relative wind flow. In this case, as well as incidentally in that of the sole compartment of single-seater aircraft wherein the same situation is encountered, the preliminary canopy frangibilizing system of the above-mentioned patent to Deplante gives full satisfaction and it is therefore unnecessary to apply thereto the improvement provided by the present invention, safety of the occupant of the rear seat 3 being fully ensured.

Such is not the case with regard to the front compartment 4 of the two-seater aircraft wherein it is to be noted that the cockpit is equipped with a plunging canopy 5, the front portion 6 of which is subjected to an overpressure P due to the aerodynamic effects of the relative wind. So, if the preliminary frangibilization system were applied thereto in the same conditions as for the rear compartment 2, this front canopy portion 6 of the forward compartment 4 would collapse at once towards the interior owing to the dynamic overpressure P which is exerted thereon and the remains would risk causing injuries to the pilot occupying the front seat 7, the more so as the speed of the aircraft is high, the canopy remains constituting as many projectiles potentially capable of hitting the pilot with a great impact force. It will therefore be in this particular case of the two-seater forward compartment 4 having a plunging canopy 5 that the present invention will get its most interesting application in view of safety.

In order better to understand the gist of the present invention, reference will be had to the larger-scale plan-view of the canopy 5 of the forward compartment 4 appearing on FIG. 2.

There has been shown thereon a peripheral system of points of frangibilization by means of adequately distributed localized explosive charges 8 controlled by a detonating fuse 9, likewise to the above-mentioned patent to Deplante. In addition to this pyrotechnical frangibilizing device 8-9, there is provided, to the rear of the canopy front portion 6 and all around a dome portion 10, a pyrotechnical fuse 11 designed for performing a continuous clear and sharp shearing through the "Plexiglas" of which aircraft canopies are made. This fuse 11 may be conveniently constituted by a flexible sectional lead tube filled with a high explosive currently available on the market under the trade name "Hexogene" and stuck against the inner side of canopy 5 through the agency of a silicone - - - rubber sheath, the whole being formed for producing a hollow-shaped charge effect.

As clearly seen on FIG. 2, the dome portion 10, as bounded by the cutting out fuse 11, has a generally trapezoidal geometric shape presenting a major rear edge or trailing edge 10A opposite to a minor front edge or leading edge 10B, both of which are convex circular arcs connected to each other by rectilinear sides 10C—10C diverging from the front to the rear.

The cutting out fuse 11 on the one hand and the detonating fuse 9 on the other hand are individually and successively set off from a percussion station 13, via a relay station 12, the cutting out fuse 11 being set off at a first time $t_1$ preceding the setting off of the detonating fuse 9 at a second time $t_2$.

It will further be noted on FIG. 2 that the dome portion 10 of canopy 5 is connected, towards its trailing edge 10A, to the adjacent part of the structure by means of textile strips or adhesive tapes 14 made for instance of synthetic material known under the trademarks "Orlon" or "Dacron". Lastly it will be noted that this dome portion 10 of canopy 5 is located right above the pilot's head and bust on the ejection axis of the front seat 7, as shown on the other Figures.

The sequence of bail-out operations in four successive periods at extremely short intervals, will now be described with reference to FIG. 3.

Upon the triggering of the bail-out procedure operated at $t_1$ time by the pilot on his front ejection seat 7, the fuse 11 cuts out without cracks dome 10 which is thus instantaneously disunited from the remainder of canopy 5, except for its loose tie by adhesive tape 14 at its trailing edge 10A. This cutting out will be conveniently conceived so as to provide for a small clearance at the joint of this trailing edge 10A with the adjacent edge of the structure, in order to allow a minute translation of the cut-out dome 10 from front to rear, sufficient for disengaging it from the near-by structure thanks to its diverging sides 10C—10C (see FIG. 2). The reason is that, however clear and sharp the pyrotechnical shearing, a macrograph would reveal ruggedness capable of bringing about a certain dog clutch engagement by intertwining of crystals; the minute rearward translation of dome 10 ensures its disengagement.

The dome 10 thus cut-out at $t_1$ time becomes a sort of free lid which will practically at once, at $t'_1$ time, rise by pivoting towards the rear about its pseudo-hinges 14, either naturally, owing to the effect of the external aerodynamic vacuum which is immediately taken over by the relative wind, or positively, owing to the effect of the internal thrust upon engagement of the top of the ejection-seat 7 at the start of its course.

However, at $t_2$ time, the detonating fuse 9 explodes the charges 8, frangibilizing the remainder of canopy 5 and more particularly its front portion 6. The latter is then presumably no longer subjected to the full aerodynamic over-pressure P which existed until $t_1$, by reason of the opening of lid 10 which tends to balance the pressures on both sides of the front portion 6 which, upon its frangibilization at $t_2$ time, could remain cohesive. Anyway, at this instant $t_2$, the pilot's knees are practically in engagement with the frangibilized portion 6 and pass therethrough in disintegrating it without risk for the pilot's legs. Even though it were assumed that the frangibilized portion 6 would collapse inwardly of the cockpit, its remains do not have time to gather speed and constitute projectiles endangering the pilot's legs which would therefore pass without injury in any event.

Thus, immediately thereafter, at $t'_2$ time, the ejected pilot is completely outside the aircraft cockpit 4, without having run the least danger from the canopy, the lid 10 of which is then folded back against the fuselage to which it remains attached by the adhesive tapes 14.

It is to be noted that this lid 10 retains its original wholeness, not having been frangibilized and being merely retracted by swinging towards the rear. This wholeness of lid 10 could have been jeopardized, on account of its inertia, at the moment of the shock caused by the upper part of the ejection-seat 7, the latter having undergone a significant ejection course start and having therefore been able to gather a substantial speed.

In order to avoid shattering lid 10 to pieces upon impact of ejection-seat 7, the present invention provides for overtopping the seat head 7A (see FIG. 4) with a push-absorber 15 which can be a mere buttress 16 hinged at 17 and associated with a compression spring 18.

I claim:

1. A method of breaking up a transparent canopy enclosing a cockpit of an aircraft and enabling a pilot seated in an ejection seat within said cockpit to be safely ejected from said cockpit, said canopy extending downwardly and forwardly with respect to an imaginary center line of the body of said aircraft and having a front portion which is located above the knees of a pilot sitting in said ejection seat and a top portion located above the head of said pilot, the method including the sequential steps of (1) explosively separating a unitary dome portion of said top portion of said canopy using a pyrotechnical device, and (2) explosively frangibilizing said front portion of said canopy at a time when the knees of said pilot sitting in said ejection seat, which is moving out of said cockpit, are almost in contact with said front portion.

2. A device for breaking up a transparent canopy enclosing a cockpit of an aircraft and enabling a pilot seated in an ejection seat with said cockpit to be safely ejected from said cockpit, said canopy extending downwardly and forwardly with respect to an imaginary center line of the body of said aircraft and having a front portion which is located above the knees of a pilot sitting in said ejection seat and a top portion located above the head of said pilot, the device including a first pyrotechnical means which extends around a part of said top portion to enclose a dome portion which has a generally elongated trapezoidal shape defining a narrow leading edge above the head of a pilot sitting in said ejection seat and a wide trailing edge, said first pyrotechnical means being capable of separating said dome portion as a unitary element from said top portion; a separate second pyrotechnical means which extends around the periphery of said canopy where it meets the body of said aircraft, said second pyrotechnical means being capable of frangibilizing said canopy; and a sequencer means connected to both said first and second pyrotechnical means for igniting said first pyrotechnical means and thereafter said second pyrotechnical means.

3. A device according to claim 2, wherein said leading and trailing edges of the dome portion enclosed by said first pyrotechnical means are shaped as convex circular arcs, and wherein said arcs are connected by substantially rectilinear sides.

4. A device according to claim 2, including flexible, adhesive hinge-forming strips connecting the rear end of said dome portion defined by said first pyrotechnical means to the body of said aircraft.

5. In an aircraft which includes a body, a cockpit in said body, an ejection seat in said cockpit, and a transparent canopy enclosing said cockpit, said canopy extending downwardly and forwardly with respect to an imaginary center line of said body and having a front portion which is located above the knees of a pilot sitting in said ejection seat and a top portion located above the head of said pilot, the improvement wherein said aircraft includes a device for breaking up said canopy, said device including a first pyrotechnical means which extends around a part of said top portion to enclose a dome portion which has a generally elongated trapezoidal shape defining a narrow leading edge above the head of a pilot sitting in said ejection seat and a wide trailing edge, said first pyrotechnical means being capable of separating said dome portion as a unitary element from said top portion; a separate second pyrotechnical means which extends around the periphery of said canopy where it meets the body of said aircraft, said second pyrotechnical means being capable of frangibilizing said canopy; and a sequencer means connected to both said first and second pyrotechnical means for igniting said first pyrotechnical means and thereafter said second pyrotechnical means.

6. The aircraft according to claim 5, wherein said ejection seat includes a back portion having a top and an elastic push absorber attached to said top to prevent the shattering of said dome portion as said ejection seat moves out of said cockpit.

* * * * *